Dec. 10, 1963 M. SZABO ETAL 3,113,651
COLLAPSIBLE FLUSH-LYING HANDLE
Filed Nov. 20, 1962 2 Sheets-Sheet 1
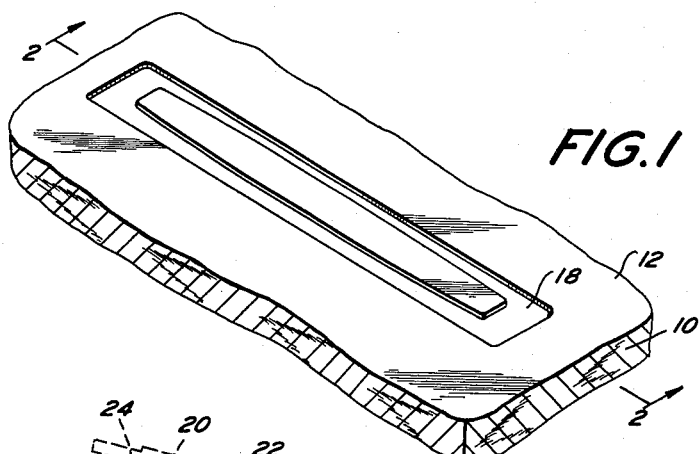
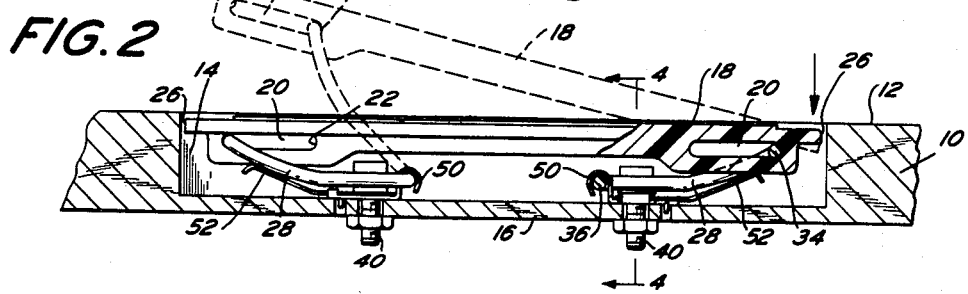
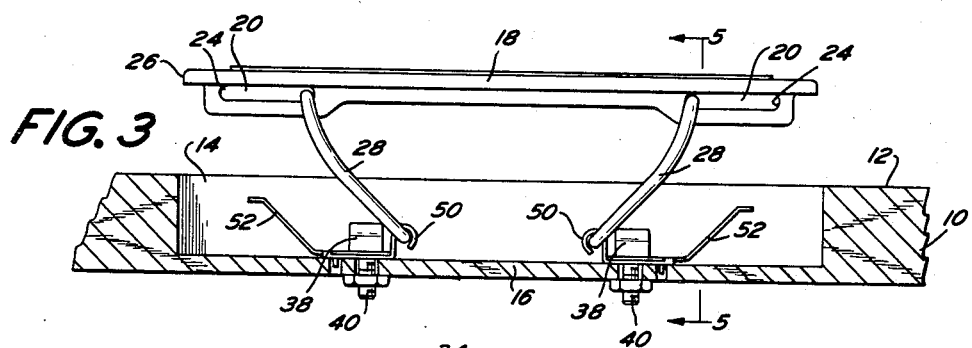
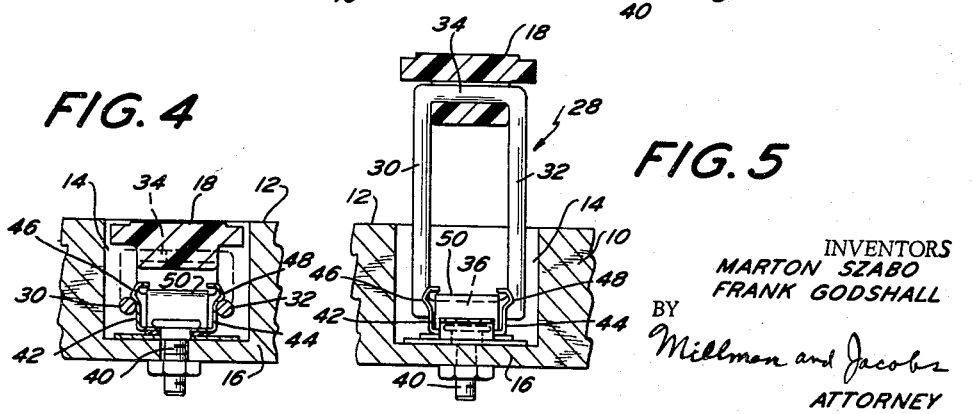
INVENTORS
MARTON SZABO
FRANK GODSHALL
BY Millman and Jacobs
ATTORNEY Dec. 10, 1963    M. SZABO ETAL    3,113,651
COLLAPSIBLE FLUSH-LYING HANDLE
Filed Nov. 20, 1962    2 Sheets-Sheet 2
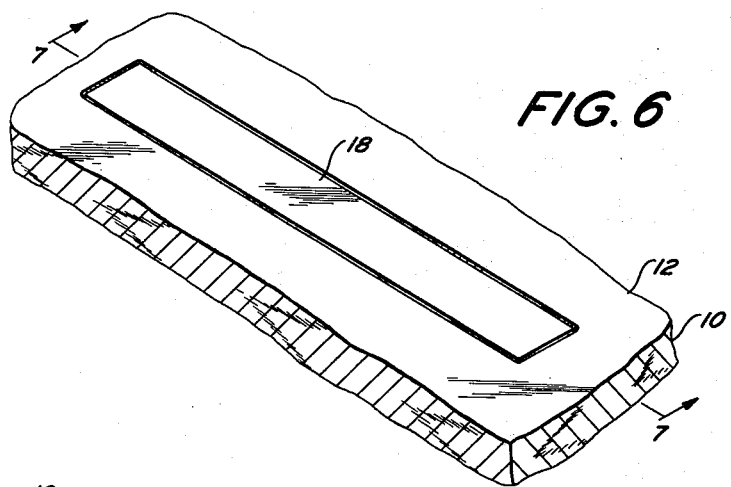
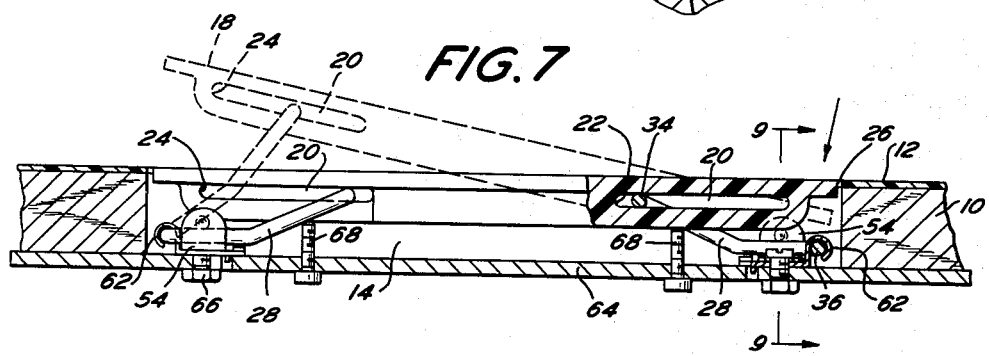
INVENTORS
MARTON SZABO
FRANK GODSHALL
BY
Millman and Jacobs
ATTORNEY United States Patent Office 3,113,651
Patented Dec. 10, 1963

3,113,651
COLLAPSIBLE FLUSH-LYING HANDLE
Marton Szabo, Broomall, and Frank Godshall, Philadelphia, Pa., assignors to Philadelphia Handle Company, Camden, N.J., a corporation of New Jersey
Filed Nov. 20, 1962, Ser. No. 238,876
8 Claims. (Cl. 190—58)

This invention relates to a handle whose primary object is to allow it to be readily and easily collapsible into a recess in the object to be carried so as to lie flush with the outer wall of the object and thereby enhance the appearance thereof without impairing the load supporting capabilities of the handle.

Another object of the invention is to provide a handle of the character above-described in which movement from its collapsed position flush with the outer wall of the object to its raised carrying positions is readily and easily effected by finger pressure on one end of the handle.

Another object of the invention is to provide a handle of the character described which includes a means to cause the handle to pop up towards its carrying position from its collapsible flush-lying position by finger pressure on one end of the handle.

The instant handle is applicable to a wide variety of carrying cases, luggage, suitcases, trunks, and the like objects. It is, however, especially well-suited for portable televisions, radios, phonographs, high fidelity units, and similar equipment. It is, therefore, an important object of this invention to provide a collapsible flush-lying handle for application to portable audio units which is not only easy to collapse to the inoperative position and raise to the carrying position, but is also virtually free of rattles when the handle is collapsed and the audio unit is in use, thereby eliminating a source of undesirable vibrations without sacrificing the need for collapsibility of the handle.

These and other objects of the invention will become more apparent as the following description proceeds in conjunction with the accompanying drawing, wherein:

FIG. 1 is a perspective view of one form of the handle looking from the top and illustrating the collapsed flush-lying position thereof;

FIG. 2 is a longitudinal sectional view taken on the line 2—2 of FIG. 1;

FIG. 3 is a view similar to FIG. 2 illustrating the raised carrying position of the handle;

FIG. 4 is a transverse sectional view taken on the line 4—4 of FIG. 2;

FIG. 5 is a transverse sectional view taken on the line 5—5 of FIG. 3;

FIG. 6 is a view similar to FIG. 1 of another form of the invention;

FIG. 7 is a longitudinal sectional view taken on the line 7—7 of FIG. 6;

FIG. 8 is a view similar to FIG. 7 illustrating the collapsed position of the handle; and FIG. 9 is a transverse sectional view taken on the line 9—9 of FIG. 7.

Specific reference is now made to the drawings in which similar reference characters are used for corresponding elements throughout.

Referring first to FIGS. 1 to 5, the object to be carried, such as a portable television set, radio, phonograph, carrying case, etc. is shown at 10 and includes an outer wall 12 with a recess 14 of predetermined size and configuration opening therethrough, the recess having a bottom or inner wall 16. The handle includes a hand grip portion 18 of plastic or other suitable material whose size and shape approximates and fits into the recess with relatively small clearance between its side and end edges and those of the recess. In its collapsed position the handle lies flush with the outer wall 12.

Extending transversely and longitudinally through the hand grip below its upper surface is a pair of slots 20 located adjacent to the ends of the hand grip. Each slot has an inner closed end 22 and an outer closed end 24 which is spaced inwardly from the corresponding outer end 26 of the hand grip for a purpose soon to appear.

A pair of links 28 are provided each ring-like and including upwardly angulated longitudinal members 30 and 32 connected by an outer transverse member 34 and an inner transverse member 36, the outer transverse member 34 extending slidably through the slot 20.

A means is provided to hinge the links to the bottom wall 16 of the object and to releasably retain the same in generally horizontal positions wherein the handle is in its collapsible flush-lying position, as seen in FIGS. 2 and 4. This means includes a pair of generally U-shaped spring clips 38, each being secured through its web to the bottom wall 16 by suitable means, such as staked-in screws 40 and the like. The arms 42 and 44 of the clip include outwardly extending protuberances 46 and 48, see FIGS. 4 and 5. The web of the clip also includes a transversely extending hook member or sleeve 50 which journals the inner transverse member 36 of the link to effect the desired hinge connection.

Integral with or otherwise secured to the web of the clip opposite the sleeve 50 is a longitudinal and vertically extending leaf spring 52.

In operation, a downward movement of the hand grip 18 into the recess is easily effected, in which movement the outer transverse members 34 of the links 28 slide in the slots 20 to assume positions closely adjacent to or abutting the outer ends 24 of the slots. In so doing, the longitudinal members 30 and 32 of each link ride over the protuberances 46 and 48 compressing the arms 42 and 44 of the spring clip until the longitudinal link members 30 and 32 assume a position beneath the protuberances as seen in FIG. 4, in which position the undersurface of the hand grip bears down on the springs 52. To raise the handle to its elevated carrying position wherein the links 28 assume a generally vertical position, as shown in FIG. 3, a downward finger pressure is applied to either end of the handle in the direction generally shown by the vertical arrow to the right of FIG. 2. Since the end 26 of the hand grip is spaced from the end 24 of the slot where the outer transverse member 34 of the link is positioned, a moment arm exists and this downward pressure causes the handle to rock around the transverse member 34 and lift the other end of the handle, as shown in dotted lines in FIG. 2. In so doing the longitudinal members 30 and 32 of the link at said other end of the handle ride over the protuberances 46 and 48. When they clear the protuberances, the leaf spring 52 takes over and causes that end of the handle to pop up. Thereafter, a slight upward pull on the handle frees the first link and allows the leaf spring thereat to pop it up. The length of the links and the slots will determine how high the hand grip will extend above the object in the final position where the outer transverse members 34 of the links abut the inner ends 24 of the slots 20.

The modification of FIGS. 6 to 9 is essentially the same in principle as the previously described handle except that no pop-up springs are provided, and the releasable spring retainers for the links are different as is the mounting means. In this modification each spring clip 54 is substantially U-shaped and includes a web 56 and spaced arms 58 having inwardly extending protuberances 60. The web is provided at one of its ends with a transverse hook or sleeve 62 which journals the inner transverse member 36 of the link 28 to effect a hinge connection therewith.

The clips are secured to a plate 64 by suitable staked-in screws 66 which are made to extend through the webs 56, the plate 64 being in turn secured to the object 10 to cover the bottom of the recess 14 by suitable screws 66.

The operation of this form of handle is substantially the same as the previously described. When the handle is collapsed to assume the flush-lying position of FIG. 7, it rests on stops 68 carried by the attaching plate 64 and not on springs. It will be seen that the longitudinal members 30 and 32 of each link move inside the arms 58 of the clip 54 and spread them as they ride over the protuberances 60 until they assume a generally horizontal position therebelow. When finger pressure is applied to either end 26 of the handle, the same is actuated to rock to the position shown in dotted lines in FIG. 7, in which action the longitudinal members 30 and 32 of the link at the other end of the handle ride over the protuberances 60 so that the operator can extend his fingers beneath the hand grip at that end and lift it up to the carrying position shown in FIG. 8.

While preferred embodiments of the invention have been shown and described, a skilled artisan may make variations which do not depart from the spirit of the invention or the scope of the appended claims.

What is claimed is:

1. In combination with an object having a wall with a recess therein of predetermined elongated size and shape a collapsible carrying handle adapted to lie in said recess and flush with said wall in its collapsed position comprising a hand grip approximating the size and shape and adapted to substantially fill said recess, longitudinal slots in said hand grip adjacent to its ends, links each including a portion slidable in one of said slots and an opposed portion hinged to said object in said recess, said links being movable from a generally horizontal position wherein said handle is collapsed into said recess to a generally vertical position in which said handle is elevated to the carrying position above said wall, and means secured to said object in said recess for releasably engaging and retaining said links in said generally horizontal position.

2. In combination with an object having a wall with a recess therein of predetermined elongated size and shape a collapsible carrying handle adapted to lie in said recess and flush with said wall in its collapsed position comprising a hand grip approximating the size and shape of said recess, longitudinal slots in said hand grip adjacent to its ends, links each including a portion slidable in one of said slots and an opposed portion hinged to said object in said recess, said links being movable from a generally horizontal position wherein said handle is collapsed into said recess to a generally vertical position in which said handle is elevated to the carrying position above said wall, and means secured to said object in said recess for releasably engaging and retaining said links in said generally horizontal position the outer ends of said slots being spaced from the ends of said hand grip and said portions of said links slidable in said slots assume positions adjacent to the outer ends of said slots in the collapsed position of the handle whereby a downward pressure at one end of said hand grip will rock the same about its corresponding link and thereby raise the other end of said hand grip causing said link retaining means at said other end to release the link thereat.

3. The combination of claim 2 and spring secured to said object in said recess bearing against the underside of said hand grip when the latter is in its collapsed position, said springs acting to cause said hand grip to pop up into its carrying position after release of said link retaining means.

4. The combination of claim 1 wherein said link retaining means includes a substantially U-shaped spring clip with protuberances in the arms thereof acting to releasably hold each link in its generally horizontal position.

5. The combination of claim 4 wherein said spring clip includes a sleeve journaling said opposed portion of said link to effect the hinging of said link.

6. In combination with an object having a wall with a recess therein of predetermined elongated size and shape, a collapsible carrying handle adapted to lie in said recess and flush with said wall in its collapsed position comprising a hand grip approximating the size and shape of said recess, longitudinal slots in said hand grip adjacent to its ends, substantially rectangular links each including longitudinal members connected at their ends by inner and outer transverse members, said outer transverse members of said links extending slidably through said slots, substantially U-shaped spring clips secured to said object in said recess each including a sleeve journaling the inner transverse member of said link to effect a hinge connection therefor, and protuberances in the arms of each clip engageable by the longitudinal members of each link to cause the arms to spread and allow clearance for said links, said links being movable past said protuberances and to be retained thereby in generally horizontal positions when the handle is collapsed, said links also being movable past said protuberances to generally vertical positions in which said handle is elevated above said wall to the carrying position.

7. The combination of claim 6 and a longitudinal and vertically extending leaf spring carried by each spring clip bearing against the underside of said handle when in its collapsed position, said leaf springs acting to cause said handle to pop up into its carrying positions after said links have cleared said protuberances when moved towards their generally vertical positions.

8. The combination of claim 6 wherein the outer ends of said slots are spaced from the ends of said hand grip and said outer transverse members of said links assume positions adjacent to said outer ends of said slots in the collapsed position of the handle, whereby a downward pressure at one end of said hand grip will rock the same about the outer transverse member of its corresponding link and thereby raise the other end of said hand grip until the longitudinal members of the link at said other end clears said protuberances.

References Cited in the file of this patent

UNITED STATES PATENTS 2,433,870    Socke _____ Jan. 6, 1948

FOREIGN PATENTS 515,072    Italy _____ Feb. 12, 1955